UNITED STATES PATENT OFFICE 2,036,249

PREPARATION OF HALOGEN ALKANE-SULPHONIC ACIDS

Roger Adams, Urbana, Ill., Harry Eatough, Wilmington, Del., and Carl S. Marvel, Urbana, Ill., assignors to E. I. du Pont de Nemours & Company, Wilmington, Del., a corporation of Delaware No Drawing. Application September 22, 1933, Serial No. 690,564

21 Claims. (Cl. 260—159)

This invention relates to the preparation of haloalkanesulphonic acids and particularly to their preparation by the reaction of a hydrogen halide with a product obtainable by the reaction of an olefin with sulphur trioxide.

This invention has for its object, the preparation of haloalkanesulphonic acids by the reaction between hydrogen halides and olefin-sulphur trioxide reaction products. A further object is the application of elevated temperature and increased pressure to the reaction. Other objects will appear hereinafter.

These objects are accomplished by the following invention, wherein a hydrogen halide of the class consisting of hydrogen fluoride, hydrogen chloride, and hydrogen bromide is reacted with the product obtainable by the reaction of an olefin with sulphur trioxide.

Chloroethanesulphonic acid can be prepared from carbyl sulphate and an excess of concentrated hydrochloric acid at temperatures above 100° C. but more particularly at temperatures approaching 170° C. The reaction involved is:

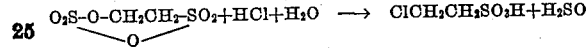

Carbyl sulphate is formed by the absorption of ethylene in liquid sulphur trioxide. This is then dissolved in concentrated hydrochloric acid and heated. The conditions for heating are recorded in table I below. After the heating the reaction mixture is evaporated over a steam bath to remove the excess hydrochloric acid, and then treated with barium carbonate. The barium sulphate and excess barium carbonate are removed by filtration and the barium chloroethanesulphonate is recovered by evaporation of the filtrate. Analysis of the barium salt for chlorine is used as the criterion of reaction, pure barium chloroethanesulphonate monohydrate having a chlorine content of 16.0%. The free acid is prepared by the reaction of sulphuric acid with the barium salt.

Table I

| Run | Wt.$SO_3$ | Wt.$C_2H_4$ | Mols HCl per mol carbyl sulphate | Temp. °C. | Time (hours) | Per cent Cl in barium salt |
|---|---|---|---|---|---|---|
| 1 | 367 | 53 | 4 | 105 | 5 | 8.67 |
| 2 | *488 | *59 | *5 | 130 | ½ | 7.54 |
| 3 | *488 | *59 | *5 | 130 | 2 | 5.74 |
| 4 | *488 | *59 | *5 | 130 | 4 | 6.80 |
| 5 | *488 | *59 | *5 | 150 | 2 | 8.94 |
| 6 | *488 | *59 | *5 | 150 | 4 | 12.49 |
| 7 | *488 | *59 | *5 | 170 | 2 | 13.89 |
| 8 | *488 | *59 | *5 | 170 | 4 | 15.10 |
| 9 | *488 | *59 | *5 | 170 | 6 | 14.79 |

* Runs 2–9. Equal portions of the total reaction mixture of sulphur trioxide and ethylene were heated in pressure vessels in an electric furnace, the pressure not being determined.

From the above table it is apparent that some chloroethanesulphonic acid is formed, even at 105° C. and at atmospheric pressure, but it is preferred to operate at 170° C. and for four hours since longer heating at this temperature adversely affects the yield.

The process has been given in detail in relation to hydrochloric acid and carbyl sulphate. The reaction is, however, applicable to the reaction of hydrogen fluoride and hydrogen bromide to carbyl sulphate, its homologs and analogs, ethionic and isethionic acids and their homologs and analogs.

Carbyl sulphate or ethionic acid or homologous products thereof can be obtained easily and in good yield by causing a sulphonating agent such as sulphur trioxide or chlorosulphonic acid, or fuming sulphuric acid, separately or mixed with one another, to react with an olefin in the presence of liquid sulphur dioxide. To obtain ethionic acid or carbyl sulphate at least two moles of the sulphonating agent per one mole of olefin are preferably used. Mixtures of the olefins, for example cracking gases, are likewise suitable for the purpose in question. An alcohol or a homolog or a derivative thereof may also be used instead of the derivatives. If an alcohol is used, one molecule of water is first separated off from the alcohol and the sulfonating agent then adds to the unsaturated compound thus produced. In this way ethylcarbyl sulphate may be prepared from butyl alcohol and a mixture of sulphur trioxide and chlorosulphonic acid in liquid sulphur dioxide. Methylcarbyl sulphate may be obtained similarly, using propylene. Olefins such as amylene, butylene, isobutylene, hexylene, alpha dodecylene, alpha decylene, alpha octadecylene, alpha tetradecylene, may likewise be reacted with sulphonating agents of the class above described to obtain homologs of carbyl sulphate which will react with hydrogen halides to give the chloroalkanesulphonic acids of the present invention.

The haloalkanesulphonic acids produced by the method of the present invention are useful in the preparation of wetting agents, taurine and its homologs, and similar products. Thus, a water soluble derivative of casein is prepared as follows. Rendered casein, 300 gms. is suspended in 600 gms. of water and 815 gms. of a solution of potassium hydroxide in water (13 gms. KOH in 50 gms. of $H_2O$) is added slowly with stirring. Thereupon, 331 gms. of a 60% solution of chloroethanesulphonic acid in water is slowly stirred in and the mass refluxed for 14 hours. On concentration of the solution to ¼ of its volume and mixing with 3 kgm. of 95% ethanol, a precipitate is formed. This, after filtration from the remaining liquid and resolution in 400 gms. of water, is reprecipitated with 3 kgm. of 95% ethanol.

There is obtained, in 80% yield, a material soluble in water and insoluble in alcohol.

In the process now employed for the preparation of haloalkanesulphonic acids and particularly chloroethanesulphonic acid, low yields are obtained and the product is contaminated with sodium chloride which is formed as a by-product. The process of the present invention on the other hand gives improved yields (90% as compared with 50%) and the sulphuric acid which is formed as a by-product is easily removed as barium sulphate. In addition to this, the necessary starting materials are cheap and readily available as compared with the starting materials necessary in the processes of the prior art.

While the process is applicable to hydrogen fluoride, hydrogen bromide and hydrogen chloride i. e., hydrogen halides wherein the halogen is of atomic weight within the range 18–80, the preferred form of the process utilizes hydrogen chloride and hydrogen bromide, and preferably hydrogen chloride because of the difficulties attendant upon working with hydrogen fluoride, and the decreased cost involved in the use of hydrogen chloride. For most of the uses of the haloalkanesulphonic acids the chloro-compounds are practically as effective as the bromo-compounds and are less expensive, particularly per unit of sulphoalkyl introduced.

As many apparently widely different embodiments of this invention may be made without departing from the spirit and scope thereof, it is to be understood that we do not limit ourselves to the specific embodiments thereof except as defined in the appended claims.

We claim:

1. A process for the preparation of haloalkanesulphonic acids, comprising reacting a concentrated hydrogen halide wherein the halogen atom is of atomic weight within the range 18–80, with the product obtainable by the reaction of an olefin with sulphur trioxide.

2. A process for the preparation of haloalkanesulphonic acids, comprising reacting a concentrated hydrogen halide of the class consisting of hydrogen chloride, and hydrogen bromide, with the product obtainable by the reaction of an olefin with sulphur trioxide.

3. A process for the preparation of haloalkanesulphonic acids, comprising reacting a concentrated hydrogen halide of the class consisting of hydrogen chloride, and hydrogen bromide, with the product obtainable by the reaction of a lower olefin with sulphur trioxide.

4. A process for the preparation of chloroalkanesulphonic acids, comprising reacting concentrated hydrogen chloride, with the product obtainable by the reaction of an olefin with sulphur trioxide.

5. A process for the preparation of chloroalkanesulphonic acids, comprising reacting concentrated hydrogen chloride with the product obtainable by the reaction of a lower olefin with sulphur trioxide.

6. A process for the preparation of chloroethanesulphonic acid, comprising reacting concentrated hydrogen chloride with the product obtainable by the reaction of ethylene with sulphur trioxide.

7. A process for the preparation of chloroethanesulphonic acid, comprising reacting concentrated hydrogen chloride for approximately four hours at approximately 170° C. with carbyl sulphate.

8. A process for the preparation of chloropropanesulphonic acid, comprising reacting concentrated hydrogen chloride with the product obtainable by the reaction of propylene with sulphur trioxide.

9. A process for the preparation of bromoalkanesulphonic acids, comprising reacting concentrated hydrogen bromide with the product obtainable by the reaction of an olefin with sulphur trioxide.

10. A process for the preparation of bromoalkanesulphonic acids, comprising reacting concentrated hydrogen bromide with the product obtainable by the reaction of a lower olefin with sulphur trioxide.

11. A process for the preparation of bromoethanesulphonic acid, comprising reacting concentrated hydrogen bromide with the product obtainable by the reaction of ethylene with sulphur trioxide.

12. A process for the preparation of bromoethanesulphonic acid, comprising reacting concentrated hydrogen bromide with carbyl sulphate.

13. A process for the preparation of haloalkanesulphonic acids which comprises heating at a temperature of approximately 150°–170° C. for two to six hours a concentrated hydrogen halide wherein the halogen atom is of atomic weight within the range 18–80 with the product obtainable by the reaction of an olefin with sulphur trioxide.

14. A process for the preparation of haloalkanesulphonic acids which comprises heating at a temperature of approximately 150°–170° C. for two to six hours a concentrated hydrogen halide of the class consisting of hydrogen chloride and hydrogen bromide with the product obtainable by the reaction of an olefin with sulphur trioxide.

15. A process for the preparation of haloalkanesulphonic acids which comprises heating at a temperature of approximately 150°–170° C. for two to six hours a concentrated hydrogen halide of the class consisting of hydrogen chloride and hydrogen bromide with the product obtainable by the reaction of a lower olefin with sulphur trioxide.

16. A process for the preparation of chloroalkanesulphonic acids which comprises heating concentrated hydrochloric acid at a temperature of approximately 150°–170° C. for two to six hours with the product obtainable by the reaction of an olefin with sulphur trioxide.

17. A process for the preparation of chloroalkanesulphonic acids which comprises heating concentrated hydrochloric acid at a temperature of approximately 150°–170° C. for two to six hours with the product obtainable by the reaction of a lower olefin with sulphur trioxide.

18. A process for the preparation of chloroalkanesulphonic acids which comprises heating concentrated hydrochloric acid at a temperature of approximately 150°–170° C. for two to six hours with the product obtainable by the reaction of ethylene with sulphur trioxide.

19. A process for the preparation of chloropropanesulphonic acids which comprises heating concentrated hydrochloric acid at a temperature of approximately 150°–170° C. for two to six hours with the product obtainable by the reaction of propylene with sulphur trioxide.

20. A process for the preparation of chloroethanesulphonic acid which comprises heating the product obtainable by the reaction of ethylene with sulphur trioxide with concentrated hydrochloric acid at a temperature of approximately 150°–170° C. for such a time, between two and six hours, that the chlorine content of the barium salt obtainable from the reaction product is at least 12.5%.

21. A process for the preparation of chloroethanesulphonic acid which comprises heating the product obtainable by the reaction of ethylene with sulphur trioxide with concentrated hydrochloric acid at a temperature of approximately 170° C. for such a time, between two and six hours, that the chlorine content of the barium salt obtainable from the reaction product is at least 14%.

ROGER ADAMS.
HARRY EATOUGH.
CARL S. MARVEL.